United States Patent
Doetsch et al.

(10) Patent No.: US 7,003,029 B2
(45) Date of Patent: Feb. 21, 2006

(54) METHOD AND DEVICE FOR EQUALIZING AND DECODING A DATA SIGNAL

(75) Inventors: Markus Doetsch, Schliern (CH); Peter Jung, Otterberg (DE); Joerg Plechinger, Munich (DE); Peter Schmidt, Erpolzheim (DE); Michael Schneider, München (DE)

(73) Assignee: Infineon Technologies, AG, Munich (DE)

( * ) Notice: Subject to any disclaimer, the term of this patent is extended or adjusted under 35 U.S.C. 154(b) by 793 days.

(21) Appl. No.: 09/933,050

(22) Filed: Aug. 20, 2001

(65) Prior Publication Data

US 2002/0034223 A1 Mar. 21, 2002

Related U.S. Application Data

(63) Continuation of application No. PCT/DE00/00292, filed on Feb. 1, 2000.

(30) Foreign Application Priority Data

Feb. 18, 1999 (DE) .......................... 199 06 865

(51) Int. Cl.
*H03H 7/30* (2006.01)

(52) U.S. Cl. ...................... 375/232; 375/340; 375/219; 375/229; 370/342; 342/165; 714/792; 700/52; 178/69 B

(58) Field of Classification Search ................. 375/340, 375/229, 219; 370/342; 342/165; 700/52; 714/792

See application file for complete search history.

(56) References Cited

U.S. PATENT DOCUMENTS

| 3,621,139 A | * | 11/1971 | Gibson ..................... 178/69 B |
| 5,142,551 A | * | 8/1992 | Borth et al. ................ 375/219 |
| 5,214,675 A |   | 5/1993 | Mueller et al. |
| 5,357,257 A | * | 10/1994 | Nevin ........................ 342/165 |
| 5,406,570 A | * | 4/1995 | Berrou et al. .............. 714/792 |
| 5,488,560 A | * | 1/1996 | Wood et al. ................. 700/52 |
| 5,970,060 A | * | 10/1999 | Baier et al. ................ 370/342 |
| 6,104,750 A | * | 8/2000 | Yiu ............................ 375/229 |
| 6,307,851 B1 | * | 10/2001 | Jung et al. .................. 370/342 |

FOREIGN PATENT DOCUMENTS

DE  40 27 496 A1  3/1992

OTHER PUBLICATIONS

V. Mignone et al.: "CD3–OFDM: A New Channel Estimation Method to Improve the Spectrum Efficiency in Digital Terrestrial Television Systems", International Broadcasting Convention 1994, Sep. 14, 1995, Conference Publication No. 413.

(Continued)

*Primary Examiner*—Stephen Chin
*Assistant Examiner*—Sudhanshu C. Pathak
(74) *Attorney, Agent, or Firm*—Laurence A. Greenberg; Werner H. Stemer; Ralph E. Locher

(57) ABSTRACT

A method for equalizing and decoding an error-protected data signal transmitted via a radio channel is described. According to the method, an equalized data signal is calculated at the receiving end in a demodulator with a first channel estimator. The equalized data signal is decoded by a decoder to determine a decoded output signal. The equalized data signal is transmitted to a second channel estimator, which repeatedly detects second channel parameters of the radio channel. The parameters are transmitted to the decoder which uses them as calculation parameters during decoding.

6 Claims, 2 Drawing Sheets

OTHER PUBLICATIONS

Raphaeli et al.: "Combined Turbo Equalization and Turbo Decoding", IEEE Communications Letters, U.S., vol. 2, No. 4, Apr. 1, 1998, pp. 107–109.

Kohno: "Adaptive Combination of Equalization and Decoding of Error–Correcting Codes", Proceedings of the International Conference on Systems Engineering, U.S., New York, IEEE, 1992, pp. 113–118.

* cited by examiner

METHOD AND DEVICE FOR EQUALIZING AND DECODING A DATA SIGNAL

CROSS-REFERENCE TO RELATED APPLICATION

This application is a continuation of copending International Application No. PCT/DE00/00292, filed Feb. 1, 2000, which designated the United States.

BACKGROUND OF THE INVENTION

Field of the Invention

The invention relates to methods and devices for equalizing and decoding an error-protection-coded data signal transmitted via a radio channel.

In the transmission of data via a radio channel, in particular a mobile radio channel, difficulties arise in particular which are associated with the fact that the transmission properties of the radio channel change continuously with time, and that a received radio signal suffers from interference from radio signals of other mobile radio subscribers.

Adaptive equalizers are used at the receiver end in order to take account of the continuous changes in the transmission properties of the radio channel. Adaptive equalizers are distinguished in that they are equipped with what is termed a channel estimator. The channel estimator continuously determines the current transmission properties (pulse responses) of the radio channel and communicates them to the equalizer. The equalizer is thereby put into the position of carrying out an equalization of the obtained received signal that is "adaptive" (that is to say adapted to the instantaneous state of the radio channel).

Coding/decoding of the transmitted/received data signal is used for the purpose of effective error protection of the transmitted data. In the case of the coding at the transmitter end, redundancy is added to the output data signal and enables the receiver to identify and correct detection errors occurring during data detection. The effect of interference can thereby be reduced.

The article titled "Combined Turbo Equalization and Turbo Decoding" by D. Raphaeli and Y. Zarai, IEEE Communications Letters, Vol. 2, No. 4, 1998, pages 107 and 109 describes an iterative receiver structure which contains a maximum a-posteriori (MAP) symbol estimator for adaptive channel estimating, and a downstream turbo decoder for decoding. The digital signal output by the MAP symbol estimator is present in what is termed a log-likelihood ratio (LLR) format. By calculating the variance of the channel noise, it is converted at the input of the turbo decoder into a "soft" (that is to say value-continuous) input signal required by the decoder.

U.S. Pat. No. 5,214,675 describes a configuration containing a linear equalizer with variable equalizer coefficients and a channel decoder. Disposed upstream of the channel decoder is an arithmetic unit in which the channel strength and the variance of the channel noise are calculated. The calculated values are supplied to the channel decoder.

SUMMARY OF THE INVENTION

It is accordingly an object of the invention to provide a method and a device for equalizing and decoding a data signal which overcome the above-mentioned disadvantages of the prior art devices and method of this general type, which achieves a prescribed bit error rate at the output of the decoder with a small overall computational outlay with reference to the steps of equalizing and decoding.

With the foregoing and other objects in view there is provided, in accordance with the invention, a method for equalizing and decoding data signals. The method includes receiving a radio signal containing an error-protection-coded data signal transmitted over a radio channel, the data signal being error-protection coded at a transmitter end. The radio signal received is sampled to generate a digital input data signal. The digital input data signal is fed to an adaptive equalizer having a first channel estimator that repeatedly determines first channel parameters of the radio channel. The adaptive equalizer uses the first channel parameters to calculate and output an equalized data signal. The equalized data signal is fed to a second channel estimator that repeatedly calculates second channel parameters including a variance of radio channel noise and a damping factor of the radio channel using a method of moments. The second channel parameters are fed to a decoder to be used as computing parameters in the decoding for calculating a decoded output signal. The equalized data signal is also fed to the decoder to determine the decoded output signal that is a reconstruction of an initial input signal on which the error-protection-coded data signal is based.

Consequently, the invention relates in general to methods and devices for adaptive equalization and for "adaptive decoding" of a received signal. A first and second channel estimator are respectively provided for calculating first channel parameters for adaptive equalization, and for calculating second channel parameters for adaptive decoding.

According to a first aspect of the invention, the calculation of the second channel parameters for decoding is based on the method of moments. This algorithm is particularly powerful and surpasses, for example, the results achieved with a MAP estimator in determining the second channel parameters. Since the degree of error protection in decoding is improved in this way, it is possible on the other hand for the computational outlay on equalization to be reduced, in order to achieve a prescribed, maximum permissible bit error ratio of the output signal. This favors the use of low-outlay, suboptimal equalizers, which will be explained in further detail below.

According to a second aspect of the invention, the "re-estimated" second channel parameters are used to adapt a turbo decoder to the channel situation. A high level of error-protection security is already achieved for a transmission signal by conventional turbo coding/decoding. The efficiency of the turbo decoding is improved by the adaptability according to the invention of the turbo decoder used and, in a way similar to the case of the first aspect of the invention, this offers the possibility of a decoding with a more favorable outlay for achieving a prescribed bit error ratio of the output signal.

In accordance with an added mode of the invention, there is the step of basing the coding and the decoding on a turbo code.

With the foregoing and other objects in view there is provided, in accordance with the invention, a method for equalizing and decoding a data signal transmitted via a radio channel and the data signal is error-protection-coded with an aid of a turbo code at a transmitter end. The method includes receiving a radio signal carrying the data signal, and sampling the radio signal received to generate a digital input data signal. The digital input data signal is fed to an adaptive equalizer having a first channel estimator which repeatedly determines first channel parameters of the radio channel, the equalizer uses the first channel parameters to calculate and output an equalized data signal. The equalized data signal is fed to a second channel estimator that repeatedly determines second channel parameters of the radio channel. The second channel parameters are fed to a turbo decoder to be used as computing parameters in the turbo decoder for calculating a decoded output signal. The equalized data signal is decoded in the turbo decoder to determine the decoded output signal which is a reconstruction of an initial input signal on which the data signal error-protection-coded at the transmitter end is based.

In accordance with an additional mode of the invention, the second channel parameters include a variance of radio channel noise, and a damping factor of the radio channel.

In accordance with another mode of the invention, there is the step of calculating the second channel parameters using a method of moments.

In accordance with a further mode of the invention, there is the step of carrying out linear zero-forcing block equalization or linear minimum-mean-square-error block equalization on the digital input signal.

With the foregoing and other objects in view there is provided, in accordance with the invention, a device for equalizing and decoding an error-protection-coded data signal transmitted over a radio channel. The device contains an adaptive equalizer having a first channel estimator. The adaptive equalizer receives a digital input data signal generated by sampling a received radio signal carrying the error-protection coded data signal. The first channel estimator repeatedly determines first channel parameters of the radio channel, the adaptive equalizer calculates and outputs an equalized data signal with an aid of the first channel parameters. A second channel estimator is connected to the adaptive equalizer and receives the equalized data signal. The second channel estimator repeatedly determines second channel parameters including a variance of radio channel noise and a damping factor of the radio channel using an algorithm based on a method of moments. A decoder is connected to the second channel estimator and receives the second channel parameters to calculate a decoded output signal. The decoder also receives the equalized data signal for determining the decoded output signal that is a reconstruction of an initial input signal on which the error-protection-coded data signal is based.

In accordance with an added feature of the invention, the decoder is a turbo decoder.

With the foregoing and other objects in view there is further provided, in accordance with the invention, a device for equalizing and decoding a data signal transmitted via a radio channel and the data signal is error-protection-coded with an aid of a turbo code. The device contains an adaptive equalizer having a first channel estimator. The adaptive equalizer receives a digital input data signal generated by sampling a received radio signal carrying the data signal error-protection-coded at a transmitter end. The first channel estimator repeatedly determines first channel parameters of the radio channel, and the adaptive equalizer calculates and outputs an equalized data signal with an aid of the first channel parameters. A second channel estimator is connected to the adaptive equalizer and receives the equalized data signal. The second channel estimator repeatedly determines second channel parameters of the radio channel. A turbo decoder is connected to the second channel estimator and receives the second channel parameters for calculating a decoded output signal. The turbo decoder also receives the equalized data signal for determining the decoded output signal which is a reconstruction of an initial input signal on which the error-protection-coded data signal error-protection-coded at the transmitter end is based.

In accordance with an additional feature of the invention, the second channel estimator estimates a variance of radio channel noise, and a damping factor of the radio channel.

In accordance with another feature of the invention, the second channel estimator operates using an algorithm based on a method of moments.

Other features which are considered as characteristic for the invention are set forth in the appended claims.

Although the invention is illustrated and described herein, as embodied in a method and a device for equalizing and decoding a data signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
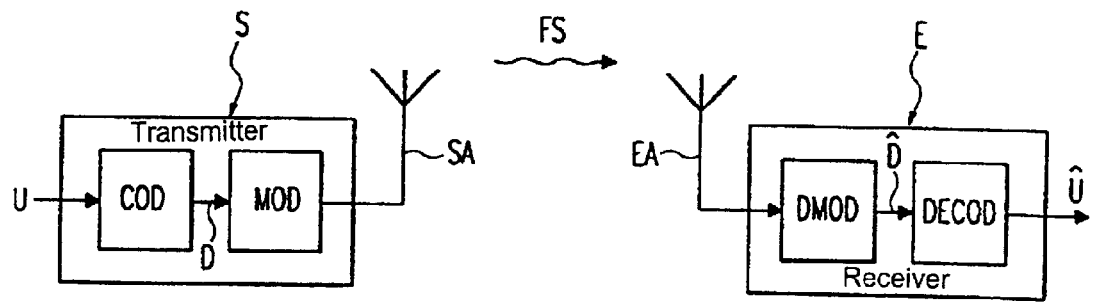
FIG. 1 is a block diagram of an air interface of a mobile radio system with a transmitter and receiver according to the invention.

In all the figures of the drawing, sub-features and integral parts that correspond to one another bear the same reference symbol in each case. Referring now to the figures of the drawing in detail and first, particularly, to FIG. 1 thereof, there is shown a transmitter S and a receiver E of a mobile radio system. The transmitter S and the receiver E can be assigned both to a base station and to a mobile station.

The transmitter S has a coder COD, a modulator MOD and a transmitting antenna SA.

The coder COD accepts a digital input signal U in the form of a sequence of data symbols (bits) $u_1, u_2, \ldots$. The input signal U carries, for example, a voice message to be transmitted. It can be generated via a microphone/amplifier analog/digital converter circuit chain (not illustrated).

The coder COD adds redundancy to the digital input signal U for the purpose of error-protection coding. An error-protection-coded data signal D of symbol sequence (bits) $d_1, d_2, \ldots$ is present at an output of the coder COD. The error-protection-coded data signal D can subsequently be interleaved (in a way not illustrated) and subdivided into blocks of prescribed length (number of symbols).

A modulator MOD modulates the error-protection-coded data signal D onto a carrier signal. The carrier signal modulated with the error-protection-coded data signal is spectrally shaped (in a way not illustrated) by a transmitting filter and amplified by a transmitting amplifier before it is emitted as a radio signal FS via the transmitting antenna SA.

The receiver has a receiving antenna EA, a demodulator DMOD and a decoder device DECOD.

The receiving antenna EA receives the radio signal FS, disturbed by environmental influences and interference with radio signals of another subscribers, and feeds it to the demodulator DMOD. The demodulator DMOD equalizes the received radio signal FS taking account of the signal interference suffered in the radio channel. An equalized data signal $\hat{D}$ provided at an output of the demodulator DMOD is present in the form of a symbol sequence whose elements $\hat{d}_1, \hat{d}_2 \ldots$ are value-continuous estimated values of the symbols $d_1, d_2, \ldots$ of the error-protection-coded data signal D.

The equalized data signal $\hat{D}$ is fed to the decoder device DECOD, at whose output a decoded output signal $\hat{U}$ having the elements $\hat{u}_1, \hat{u}_2, \ldots$ is provided. The elements $\hat{u}_1, \hat{u}_2, \ldots$ of the decoded output signal $\hat{U}$ are hypotheses of the symbols $u_1, u_2, \ldots$ of the transmitting-end input signal U in the form of discrete values from the symbol set (for example 0.1) of the input signal.

The output-end bit error rate is defined by the relative frequency of erroneous estimates $u_n \neq \hat{u}_n$, n=1, 2, .... It may not exceed a maximum permissible value as a rule in the case of mobile radio applications.

Figure 2:
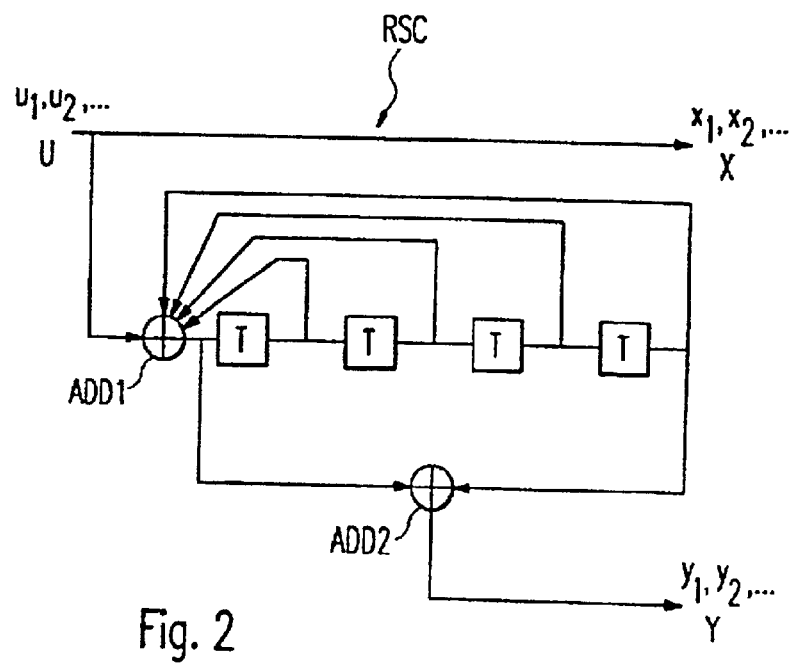
FIG. 2 is a block diagram of a recursive convolutional coder, as it can be used in the transmitter in accordance with FIG. 1 in order to code an original input signal.

FIG. 2 shows a block diagram of a recursive systematic convolutional coder RSC such as can be used, for example, as the coder COD in the transmitter S. The convolutional coder RSC has on an input side a first adder ADD1 and a shift register, downstream of the adder ADD1, with four cells T. The convolutional coder RSC has a first output, at which it outputs a data sequence X whose elements $x_1, x_2, \ldots$ are identical to the elements $u_1, u_2, \ldots$ of the input signal sequence U. Coders with this property are denoted as systematic coders. At a second output, the convolutional coder RSC provides a redundancy data sequence Y of the elements $y_1, y_2, \ldots$, which is formed by a second adder ADD2. It becomes clear that a redundancy bit $y_n$ (n=1, 2, ...) present at a specific instant at the second output is a function of the current input bit $u_n$ of the input signal sequence U.

The convolutional coder RSC illustrated in FIG. 2 generates exactly two output bits $x_n$ and $y_n$ per input bit $u_n$, that is to say it has a code rate $R_c$ (number of input bits/number of output bits)=0.5.

During use of the recursive systematic convolutional coder RSC shown in FIG. 2, the error-protection-coded data signal D (see FIG. 1) is composed alternately of the elements of the systematic data sequence X and of the redundancy data sequence Y, that is to say D=($x_1, y_1, x_2, y_2, \ldots$).

What is termed a turbo coder can also be used as the coder COD. A turbo coder essentially consists of two parallel-connected recursive systematic convolutional coders RSC in accordance with FIG. 2. Consequently, the systematic data sequence X with the elements $x_1, x_2, \ldots$ and two redundancy subsequences Y1 and Y2 of the elements $y1_n$ and $y2_n$, n=1, 2, ... is available at its output. In order to achieve a code rate $R_c$=0.5 in the case of a turbo coder, as well, the two redundancy subsequences Y1 and Y2 are alternately punctured and multiplexed. The resulting redundancy data sequence Y=($y1_1, y2_2, y1_3, y2_4, \ldots$) is then multiplexed in th already described alternately with the systematic data sequence X. The error-protection-coded data signal D produced during turbo coding can therefore have the form D=($x_1, y1_1, x_2, y2_2, x_3, y1_3, x_4, y2_4, \ldots$).

Figure 3:
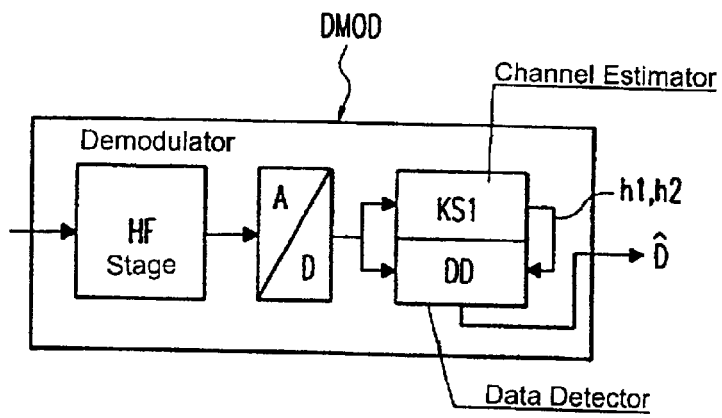
FIG. 3 is a block diagram of the demodulator illustrated in FIG. 1.

FIG. 3 shows a block diagram of the receiver-end demodulator DMOD. A high-frequency stage HF accepts the radio signal FS received by the receiving antenna EA, and converts it in the usual way by mixing down into an analog received signal. The analog received signal is digitized by an analog-to-digital (A/D) converter with a sufficiently high sampling rate and, if appropriate, its bandwidth is limited by a downstream digital filter (not illustrated).

The digital (if appropriate, bandwidth-limited) input data signal is fed both to a data detector DD and to a first channel estimator KS1.

The task of the first channel estimator KS1 consists in continuously determining first channel parameters h1, h2, ... that characterize the current transmission properties of the radio channel.

The first channel parameters h1, h2, ... of the radio channel can, for example, be parameters that describe the functional profile of the channel pulse response h (that is to say the response of the radio channel at time t to a Dirac pulse fed into the channel at the time (t=τ)).

The channel estimation in the first channel estimator KS1 can be carried out continuously (with the aid of a pilot signal continuously received in addition to the radio signal FS), or at specific instants (with the aid of training sequences specifically installed in the radio signal FS for channel estimation and known to the channel estimator).

The data detector DD calculates the equalized data signal $\hat{D}$ in the form of a sequence of elements ($\hat{d}_1, \hat{d}_2, \ldots$) from the ("disturbed") digital input data signal with the aid of the first channel parameters h1, h2, .... The elements $\hat{d}_n$ can either contain the discrete values of the symbols set of the coded sequence D (for example 0, 1), or can be value-continuous estimated values (for example from the interval [0, 1]) of these.

The first channel estimator KS1 and the data detector DD together form an equalizer.

On the basis of a second estimate or re-estimate of channel parameters according to the invention and to be explained below, a comparatively simple, suboptimal data detector DD can be used in the equalizer. For example, the data detector can be a linear zero-forcing block equalizer (ZF-BLE) or a linear minimum-mean-square-error block equalizer (MMSE-BLE). It is true that, unlike nonlinear data detectors DD, these two data detectors DD do not achieve a minimal bit error ratio, but they have the advantage that the computing algorithm on which they are based can be carried out very favorably in terms of outlay (that is to say quickly).

The computing algorithms on which the ZF-BLE and MMSE-BLE are based are explained in detail in the book entitled "Analyse und Entwurf digitaler Mobilfunksysteme" ["Analysis and Design of Digital Mobile Radio Systems"] by P. Jung, Stuttgart, B. G. Teubner, 1997 in chapter 5.3 on pages 206 to 224, in particular chapter 5.3.4 (pages 221 to 224). They are hereby incorporated by reference into the present document.

Figure 4:
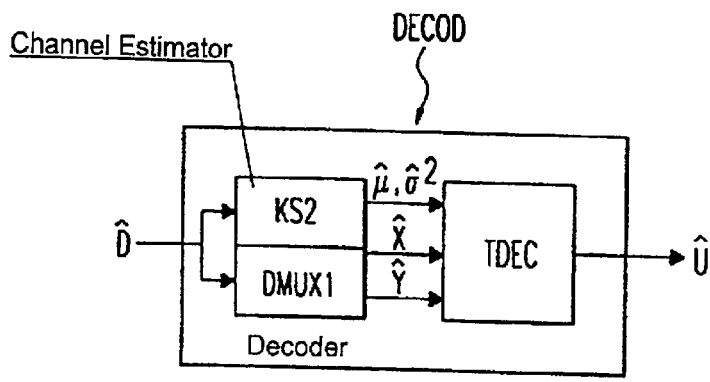
FIG. 4 is a block diagram of the decoder device illustrated in FIG. 1.

FIG. 4 shows a block diagram of the decoder device DECOD illustrated in FIG. 1. The decoder device DECOD contains a second channel estimator KS2, a demultiplexer DMUX1 and a decoder which is a turbo decoder TDEC in the present example (and with the assumption that the transmitting-end coder COD is a turbo coder).

Both the second channel estimator KS2 and the demultiplexer DMUX1 are fed the equalized data signal (data sequence $\hat{D}$). The demultiplexer DMUX1 divides the data sequence $\hat{D}$ into its equalized systematic component (data sequence $\hat{X}$ and its equalized redundancy component (redundancy sequence $\hat{Y}$). In the case considered here of use of a turbo coder as the coder COD, the equalized redundancy sequence $\hat{Y}$ is based on the two alternating punctured redundancy subsequences Y1, Y2 generated at the transmitter end, that is to say $\hat{D}=(\hat{x}_1, \hat{y}1_1, \hat{x}_2, \hat{y}2_2, \hat{x}_3, \hat{y}1_3, \hat{x}_4, \hat{y}2_4, \ldots)$.

An algorithm for calculating second channel parameters which is preferably used in the second channel estimator KS2 is described below. This algorithm is denoted as the method of moments.

The influence of the radio channel on the transmitted error-protection-coded data signal can be described in a simplified model of the radio channel in the following way:

$$\hat{d}_n = \mu \cdot d_n + n_n \quad \text{Equation 1}$$

Here, $\mu$ is a damping factor of the radio channel an $n_n$ represents an interference contribution based on channel noise.

Assuming that the error-protection-coded data symbols $d_1, d_2, \ldots$ generated by the transmitter S are realizations of a uniformly distributed random process, a probability density in accordance with $$w(\mu \cdot d_n) = \frac{1}{2}\delta(d_n - \mu) + \frac{1}{2}\delta(d_n + \mu) \quad \text{Equation 2}$$

results for this process, $\delta$ denoting the Dirac delta distribution.

Assuming the model of a white channel noise with a variance of $\sigma^2$, a noise power density spectrum is given by $$p(n_n) = \frac{1}{\sqrt{2 \cdot \pi \cdot \sigma^2}} \exp\left(\frac{-1}{2\sigma^2} n_n^2\right) \quad \text{Equation 3}$$

The power density of the received (equalized) data signal $\hat{D}$ is therefore determined by the following expression:

$$\begin{aligned} p(\hat{d}_n) &= w(\mu \cdot d_n) * p(n_n) \\ &= \frac{1}{\sqrt{8 \cdot \pi \cdot \sigma^2}} \left\{\exp\left(\frac{-1}{2\sigma^2}(\hat{d}_n - \mu)^2\right) + \right. \\ &\quad \left. \exp\left(\frac{-1}{2\sigma^2}(\hat{d}_n + \mu)^2\right)\right\} \end{aligned} \quad \text{Equation 4}$$

Here, * denotes the convolution product.

The second statistical moment $M_2$ of the power density distribution can be written as $$M_2 = E\{(\hat{d}_n)^2\} = \int_{-\infty}^{\infty} (\hat{d}_n)^2 p(\overline{d}_n) d\overline{d}_n = \mu^2 + \sigma^2 \quad \text{Equation 5}$$

where E{ } denotes the expectation over a prescribed number of elements (that is to say realizations) of the random variable present in the bracketed expression.

A fourth statistical moment $M_4$ is yielded using equation 5 as $$\begin{aligned} M_4 &= E\{(\hat{d}_n)^4\} = \int_{-\infty}^{\infty} (\hat{d}_n)^4 p(\hat{d}_n) d\hat{d}_n \\ &= \mu^4 + 6\mu^2\sigma^2 + 3\sigma^4 \end{aligned} \quad \text{Equation 6}$$

The channel parameters and $\hat{\mu}$ and $\hat{\sigma}^2$ estimated by KS2 can then be calculated from the equalized data signal $\hat{D}$ in accordance with the following equations $$\hat{\mu} = \sqrt[4]{\frac{3M_2^2 - M_4}{2}} = \sqrt[4]{\frac{3E\{(\hat{d}_n)^2\}^2 - E\{P(\hat{d}_n)^4\}}{2}} \quad \text{Equation 7.1}$$

$$\hat{\sigma}^2 = M_2 - \sqrt{\frac{3M_2^2 - M_4}{2}} = E\{(\hat{d}_n)^2\} - \sqrt{\frac{3E\{(\hat{d}_n)^2\}^2 - E\{P(\hat{d}_n)^4\}}{2}} \quad \text{Equation 7.2}$$

Figure 5:
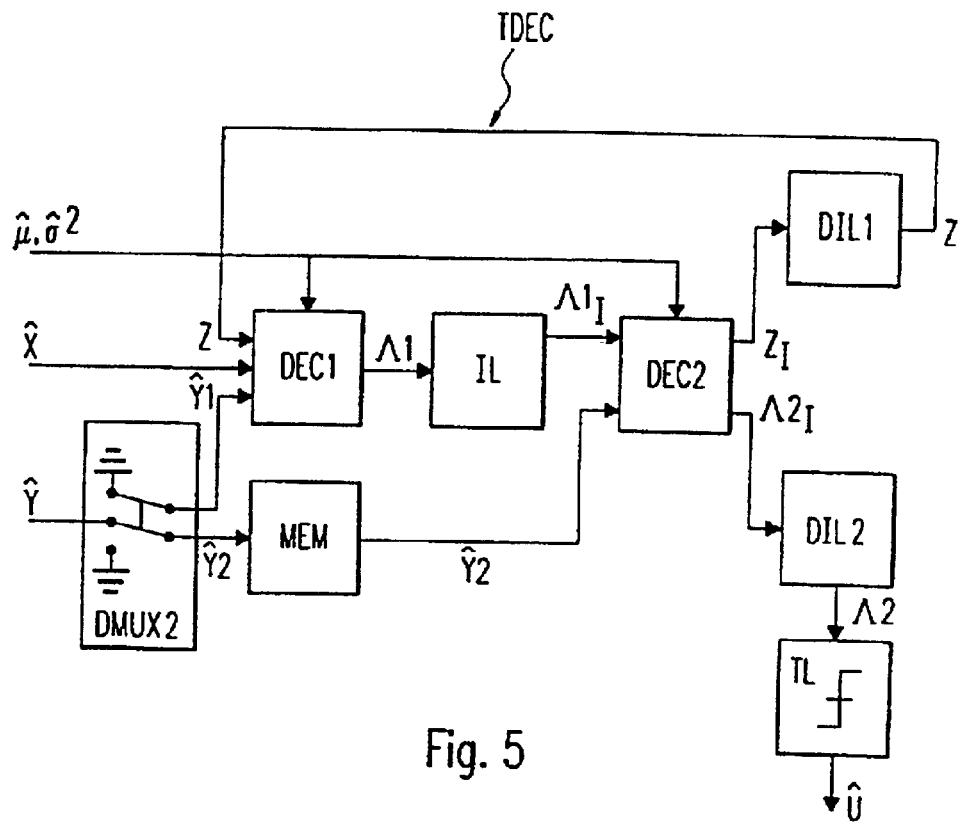
FIG. 5 is a block diagram of the turbo decoder illustrated in FIG. 4.

FIG. 5 shows in detail the turbo decoder TDEC illustrated in FIG. 4.

The turbo decoder TDEC contains a demultiplexer DMUX2, a memory MEM, a first and second convolutional decoder DEC1 and DEC2, an interleaver IL, a first and a second deinterleaver DIL1 and DIL2 and a decision logic TL.

The demultiplexer DMUX1 feeds the turbo decoder TDEC the equalized systematic data sequence $\hat{X}$ (detected version of the input sequence U (=X)) and the equalized redundancy sequence $\hat{Y}$ (detected version of the punctured redundancy subsequences Y1, Y2 generated in a turbo coder by two recursive systematic coders RSC). The demultiplexer DMUX2 divides the equalized redundancy sequence $\hat{Y}$ into the two equalized redundancy subsequencies $\hat{Y}1$ and $\hat{Y}2$.

The first decoder DEC1 calculates (a sequence of) reliability information $\Lambda 1$ from $\hat{X}$ and $\hat{Y}1$ and a feedback sequence Z, using the estimated second channel parameters $\hat{\mu}$ and $\hat{\sigma}^2$. Each element $\Lambda 1$ ($u_n$) of the sequence $\Lambda 1$ is a value-continuous estimated value for a symbol (bit) $u_1$, $u_2, \ldots$ of the input sequence U.

The reliability information $\Lambda 1$ is interleaved by the interleaver IL and fed to the second convolutional decoder DEC2 as interleaved reliability information $\Lambda 1_I$. The second convolutional decoder DEC2 calculates an interleaved feedback sequence $Z_I$ and an interleaved sequence $\Lambda 2_I$ from the interleaved reliability information $\Lambda 1_I$ and $\hat{Y}2$, using the second (estimated) channel parameters $\hat{\mu}$ and $\hat{\sigma}^2$.

The interleaved feedback sequence $Z_I$ is deinterleaved by the first deinterleaver DIL1 and yields the feedback sequence Z. The elements $\Lambda 2_I$ ($u_n$) of the sequence $\Lambda 2_I$ are value-continuous a-posteriori likelihood ratios (LLRs: Log-Likelihood Ratios) for the uncoded data symbols $u_1$ to $u_N$ of the input sequence U:

$$\Lambda 2_I(u_n) = \log\left\{\frac{P(u_n = 1|\hat{X})}{P(u_n = 0|\hat{X})}\right\} \quad \text{Equation 8}$$

Here, $P(u_N=1|\hat{X})$ and $P(u_N=0|\hat{X})$ denote the conditional probabilities that the symbol $u_N$ is equal to 1 or equal to 0 on condition that the equalized systematic data sequence $\hat{X}$ has been detected.

These conditional probabilities are "a-posteriori probabilities", since conclusions are drawn from an event that has occurred (the detected sequence $\hat{X}$) regarding the probabilities of the uncoded $u_1$ to $u_N$ on which this event is based.

The sequence $\Lambda 2_I$ is deinterleaved by the second deinterleaver DIL2 and fed to the decision logic TL as deinterleaved sequence Λ2. The decision logic TL determines a reconstructed symbol û$_n$=0 for each element of the sequence Λ2 with a value ≦0, and a reconstructed bit $\hat{\mu}_n$32 1 for each element of Λ2 with a value of >0.

The first and second convolutional decoders DEC1 and DEC2 can be implemented in the form of MAP symbol estimators. MAP symbol estimators have the advantage that they achieve the smallest possible bit error ratio. However, it is also possible to use suboptimal convolutional decoders DEC1, DEC2 which require a substantially smaller computational outlay in conjunction with an acceptable increase in the bit error ratio.

It will be explained below how in the case of the "adaptive" decoding according to the invention the second channel parameters $\hat{\mu}$ and $\hat{\sigma}^2$ are also incorporated into the calculation of the decoded output signal Û. The explanations relate in this case to the use of MAP symbol estimators as convolutional decoders DEC1 and DEC2. A detailed description of the computing algorithm on which the MAP symbol estimation is based is given in chapter E.3.3 "Rekursive MAP-Symbolschätzung" ["Recursive MAP Symbol Estimation"] of the book by P. Jung on pages 353 to 361. The computing algorithm given there is hereby incorporated into the present document by reference.

It may be gathered from the chapter E.3.3 taking into reference that an important calculating step in decoding by use of MAP symbol estimators concerns the calculation of metrics $\gamma_n^{iu}$ ($R_n$, m'$_T$, m$_T$) in accordance with equation E.40 of this chapter. In this case, $R_n$ designates a value triple ($x_n$, y1$_n$, $Z_n$) of systematic information, redundancy information and recursion information in accordance with equation E.31 of the chapter previously designated, and m'$_t$ and m$_T$ designate two different states of the transmitter-end convolutional coder RSC in a trellis diagram (the convolutional coder RSC can be interpreted as a finite automatic machine, and its states can, as is known, be described with the aid of a trellis diagram).

According to the equation E.51 of chapter E.3.3, calculation of the metrics $\gamma_n^{iu}$ ($R_n$, m'$_T$, m$_T$) includes the variance $\sigma^2$ of the channel noise and the damping factor of the radio channel $\mu$ (designated in chapter E.3.3 as $\sigma_T^2$ and $a_{x,n}$ or $a_{y,n}$).

To date, these parameters have been prescribed as constants in the calculation of the metrics $\gamma_n^{iu}$ ($R_n$, m'$_T$, m$_T$)

Both the first and the second convolutional decoders DEC1, DEC2 supply at their outputs calculated values adapted to the instantaneous state of the radio channel by virtue of the fact that these parameters are now determined within the framework of the channel estimation according to the invention and are made available in continuously updated form by the second channel estimator KS2 both to the first and to the second convolutional decoder DEC1, DEC2.

The bit error ratio of the output signal Û of the decoder device DECOD is substantially improved by this "adaptive" decoding. As a result, an enhanced transmission quality is achieved in conjunction with the same computational outlay as heretofore or—which is equivalent hereto—a smaller computational outlay than heretofore is achieved for the same transmission quality.

We claim:

1. A method for equalizing and decoding data signals, which comprises the steps of:

receiving a radio signal containing an error-protection-coded data signal transmitted over a radio channel, the data signal being error-protection coded at a transmitter end;

sampling the radio signal received to generate a digital input data signal;

feeding the digital input data signal to an adaptive equalizer having a first channel estimator which repeatedly determines first channel parameters of the radio channel, the adaptive equalizer uses the first channel parameters to calculate and output an equalized data signal;

feeding the equalized data signal to a second channel estimator which repeatedly calculates, according to a method of moments, second channel parameters including a variance of radio channel noise and a damping factor of the radio channel, with both the variance of radio channel noise and the damping factor of the radio channel being calculated in dependence on statistical moments of the equalized data signal;

feeding the second channel parameters to a decoder to be used as computing parameters in the decoding for calculating a decoded output signal; and decoding the equalized data signal in the decoder to determine the decoded output signal which is a reconstruction of an initial input signal on which the error-protection-coded data signal is based.

2. The method according to claim 1, which comprises basing a coding and the decoding on a turbo code.

3. The method according to claim 1, which comprises carrying out one of linear zero-forcing block equalization and linear minimum-mean-square-error block equalization on the digital input signal.

4. A device for equalizing and decoding an error-protection-coded data signal transmitted over a radio channel, the device comprising:

an adaptive equalizer having a first channel estimator, said adaptive equalizer receiving a digital input data signal generated by sampling a received radio signal carrying the error-protection coded data signal, said first channel estimator repeatedly determining first channel parameters of the radio channel, said adaptive equalizer calculating and outputting an equalized data signal with an aid of the first channel parameters;

a second channel estimator connected to said adaptive equalizer and receiving the equalized data signal, said second channel estimator repeatedly determining, according to an algorithm based on a method of moments, second channel parameters including a variance of radio channel noise and a damping factor of the radio channel, with both the variance of radio channel noise and the damping factor of the radio channel being determined in dependence on statistical moments of the equalized data signal; and a decoder connected to said second channel estimator and receiving the second channel parameters to calculate a decoded output signal, said decoder also receiving the equalized data signal for determining the decoded output signal which is a reconstruction of an initial input signal on which the error-protection-coded data signal is based.

5. The device according to claim 4, wherein said decoder is a turbo decoder.

6. The device according to claim 4, wherein said adaptive equalizer is selected from the group consisting of linear zero-forcing block equalizers and linear minimum-mean-square-error block equalizers.

* * * * *